Oct. 7, 1958 D. E. WIEGAND 2,855,466

MAGNETIC TRANSDUCER HEAD

Original Filed June 20, 1952 4 Sheets-Sheet 1

Inventor
DAVID E. WIEGAND by Hill, Sherman, Meroni, Gross & Simpson
Attys.

Oct. 7, 1958 D. E. WIEGAND 2,855,466

MAGNETIC TRANSDUCER HEAD

Original Filed June 20, 1952 4 Sheets-Sheet 2

Inventor
DAVID E. WIEGAND by Hill, Sherman, Meroni, Gross & Simpson Attys.

Inventor
DAVID E. WIEGAND by Hill, Sherman, Meroni, Gross & Simpson Attys.

Oct. 7, 1958 D. E. WIEGAND 2,855,466

MAGNETIC TRANSDUCER HEAD

Original Filed June 20, 1952 4 Sheets-Sheet 4

Inventor
DAVID E. WIEGAND by Hill, Sherman, Meroni, Gross & Simpson Attys.

2,855,466
Patented Oct. 7, 1958

2,855,466

MAGNETIC TRANSDUCER HEAD

David E. Wiegand, Villa Park, Ill., assignor to Armour Research Foundation of Illinois Institute of Technology, Chicago, Ill., a corporation of Illinois Application March 3, 1955, Serial No. 491,942

10 Claims. (Cl. 179—100.2)

This invention relates to a magnetic head construction, and particularly to a magnetic head construction responsive directly to magnetic flux rather than to rate of change of flux.

It is an important object of the present invention to provide a novel and improved magnetic head construction.

It is another object of the present invention to provide a novel head construction adapted to respond directly to magnetic flux rather than to the rate of change thereof and providing improved noise characteristics.

A feature of the invention resides in the provision of a magnetic head construction having relatively thin saturating strips for providing a high signal-to-noise ratio and rigid supporting members carrying said saturating strips.

A further feature of the invention resides in the utilization of saturating strips having relatively broad surfaced end portions for extended surface contact with cooperating pole pieces and relatively narrow intermediate portions for providing favorable noise characteristics.

Another feature of the invention resides in the provision of separable saturating strips which can be removed and replaced as desired along with the windings thereon.

Still another feature of the invention resides in the provision of a head construction minimizing deformation of the core pieces to insure uniformity in magnetic characteristics thereof.

A still further feature of the invention resides in the provision of a pair of saturating strip portions formed from the same piece of material to insure uniform magnetic characteristics.

Other and further important objects, features and advantages of the present invention will be apparent from the following description taken in conjunction with the accompanying drawings, in which.

As shown on the drawings.

The present invention particularly relates to improvements in magnetic modulator head constructions such as disclosed in my copending application Serial No. 294,684, filed June 20, 1952, of which the present application is a continuation-in-part. Such a magnetic modulator head advantageously employs one or more saturating strips which provide a reduced cross section flux path in comparison to the remainder of the head construction. It has been found that the signal-to-noise ratio in a magnetic modulator head is brought within the useful range for audio signals by providing saturating parts in the magnetic circuit of the head of reduced cross section. Further within limits, the strength of the useful signal from the head is essentially unaffected by this reduction in cross section. More specifically, the optimum signal-to-noise ratio and linear operation are obtained when the saturating parts are of cross section such that a maximum signal on the record member will produce a flux density in the saturating members which when added to any polarizing flux density is in the range between about ⅓ and ⅔ of intrinsic saturation induction for the material of the saturating members. The maximum usable total cross sectional area of the saturating members for reproduction of music is equal to about $$\frac{50\ (\Phi_t+P+F)}{B_s}$$

where $\Phi_t$ is the maximum residual flux capacity of the tape, P is any polarizing flux in the saturating strips, F is any feedback flux introduced into the saturating strips (F being positive for positive feedback and negative for negative feedback) and $B_s$ is the intrinsic saturation induction for the material of the saturating members, the values being taken in consistent units, and the head operating with optimum amplitude of excitation flux for a maximum signal-to-noise ratio as disclosed in my copending application Serial No. 492,013 filed of even date herewith.

Figure 1:
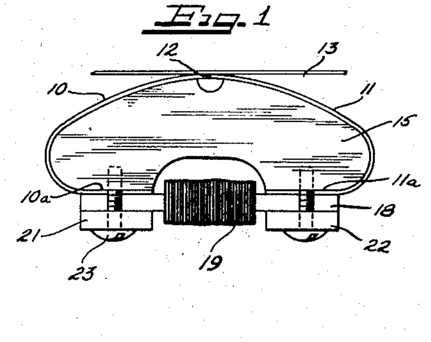
Figure 1 is a somewhat diagrammatic side elevational view of a first head construction in accordance with the present invention.

Figures 1 through 6 of the drawings illustrate a first head construction for advantageously employing saturating strips of minimum cross section. As illustrated in Fig. 1, the head comprises a pair of pole pieces 10 and 11 defining a non-magnetic gap 12 for coupling to a magnetic record member 13 traveling successively across the poles. The pole pieces may be suitably secured to a non-magnetic mounting slug 15.

Figure 2:
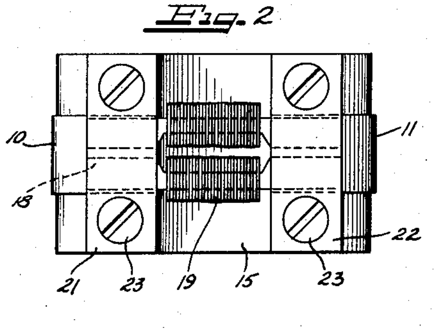
Figure 2 is a bottom plan view of the head construction of Fig. 1.

For completing the magnetic circuit including the gap 12 and the pole pieces 10 and 11, a pair of saturating strips 17 are clamped against the free ends 10*a* and 11*a* of the pole pieces. It has been found very advantageous to provide a support member 18 of insulating material for each of the saturating strips 17, the support members 18 greatly facilitating the handling of the saturating members and the winding of coil means such as 19 thereon. As illustrated in Figs. 1 and 2, the saturating members and their supports may be clamped against the pole pieces by means of clamp bars 21 and 22 and screws 23 which are threaded into the slug 15.

Figure 3:
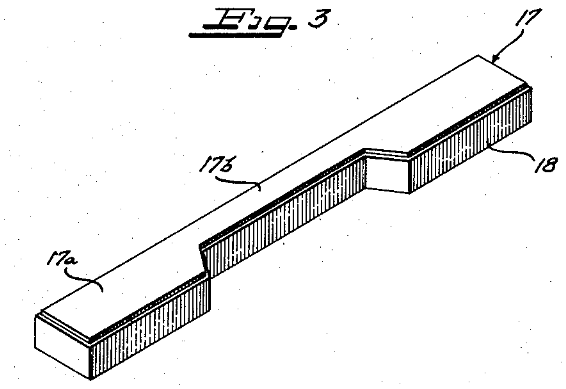
Figure 3 is a perspective view of a saturating strip and support member therefor as utilized in the embodiment of Fig. 1.

It will be observed from Fig. 3 that the saturating members 17 have enlarged portions 17*a* in extended contact with the pole free ends 10*a* and 11*a* respectively to provide low reluctance connections therewith. The central portion of the saturating strip as indicated at 17*b* is substantially reduced to provide the desired signal-to-noise ratio.

Figure 4:
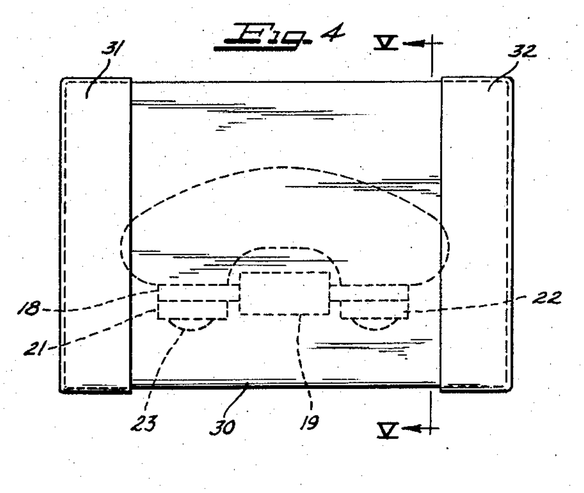
Figure 4 is a side elevational view illustrating a housing for the head of Fig. 1.
Figure 5:
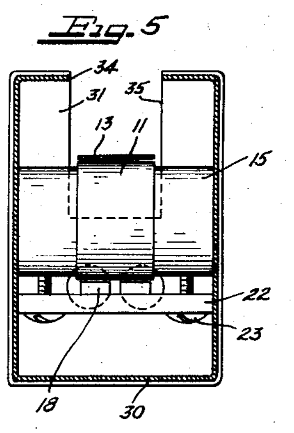
Figure 5 is a transverse sectional view taken along the line V—V of Fig. 4.
Figures 6, 7, 8:
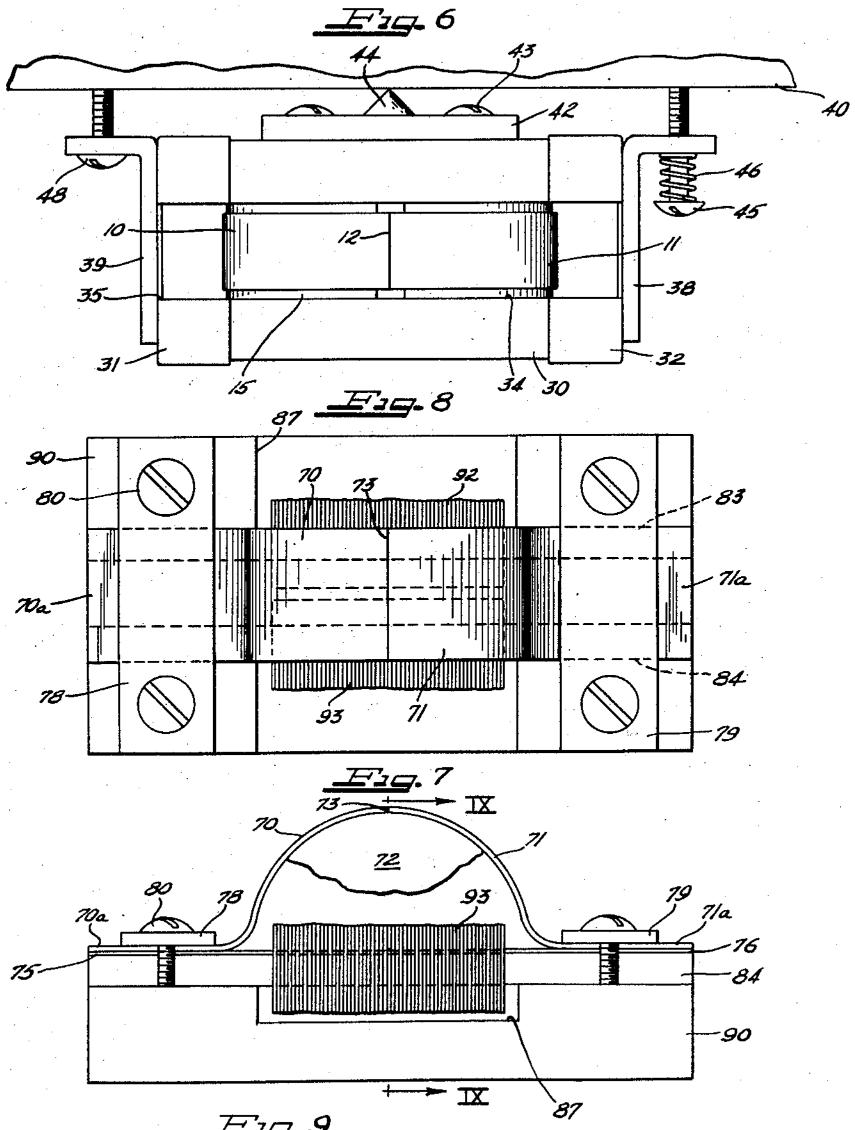
Figure 6 is a diagrammatic top plan view of the structure of Fig. 4.
Figure 7 is a somewhat diagrammatic side elevational view of a further form of magnetic head construction in accordance with the present invention.
Figure 8 is a top plan view of the structure of Fig. 7.

Figures 4, 5 and 6 illustrate a suitable housing for the head of Figs. 1 and 2 including an open ended box-like body 30 and end caps 31 and 32. It will be observed that the body 30 has a slot 34 along the top thereof for accommodating the tape 13 in magnetic coupling relation to the gap 12 of the head. The end caps have corresponding slots such as 35 in Fig. 5 for the same purpose. The housing is preferably of magnetic material to provide shielding for the head.

As illustrated in Fig. 6, the housing may be provided with brackets 38 and 39 for securing the housing to a suitable mounting surface 40. In the illustrated form, the housing also has a fulcrum plate 42 secured thereto by screws 43 to provide a fulcrum 44 bearing against the surface 40 to accommodate angular adjustment of the gap 12 with respect to the path of the magnetic record member thereacross. To this end, a screw 45 extends freely through the bracket 38 and urges a spring 46 against the bracket so that a second screw 48 extending through the bracket 39 can be adjusted to adjust the angle between the gap 12 and the path of the record member.

By way of example of an actual embodiment according to Figs. 1 to 6, the pole pieces 10 and 11 may comprise .014 inch "Mumetal" straps having a .00025 inch copper or silver gap spacer therebetween and secured to a brass mounting slug. The "Mumetal" straps, the gap spacer and the brass slug may be sweat-soldered in a suitable fixture, applying pressure against the gap spacer. After soldering, the pole piece straps are finished flat at the bottom surfaces of ends 10*a* and 11*a* for good magnetic joints with the saturating strips which may be made of "Molybdenum Permalloy." "Mumetal" as used herein refers to an alloy consisting of 5% copper, 2% chromium, 77% nickel, and the remainder iron and minor constituents. "Molybdenum Permalloy" comprises 4% molybdenum, 79% nickel, and the remainder iron and minor constituents. The term "Molypermalloy" will be used herein as an abbrevation for "Molybdenum Permalloy." Two small Bakelite guide strips (not shown) may be cemented to the brass slug at both ends of the gap to serve as guides for the tape over the head.

The saturating strips may have a thickness of .001 inch and a minimum width dimension of approximately .030 inch and an overall length of 1 inch. The supporting strips 18 may be of Bakelite or other non-magnetic material, and have a thickness of .060 inch and a minimum width of for example .060 inch. The windings 19 may each comprise 42 bifilar turns in 3 layers of approximately 15, 14 and 13 turns in that order. The "Molybdenum Permalloy" saturating pieces after annealing may be cemented to the Bakelite support plates 18 and then the coils wound thereon. The shielding housing may be made of "Mumetal" while the various parts making up the swivel mount for the housing may be of non-magnetic material.

Figures 13, 14, 19:
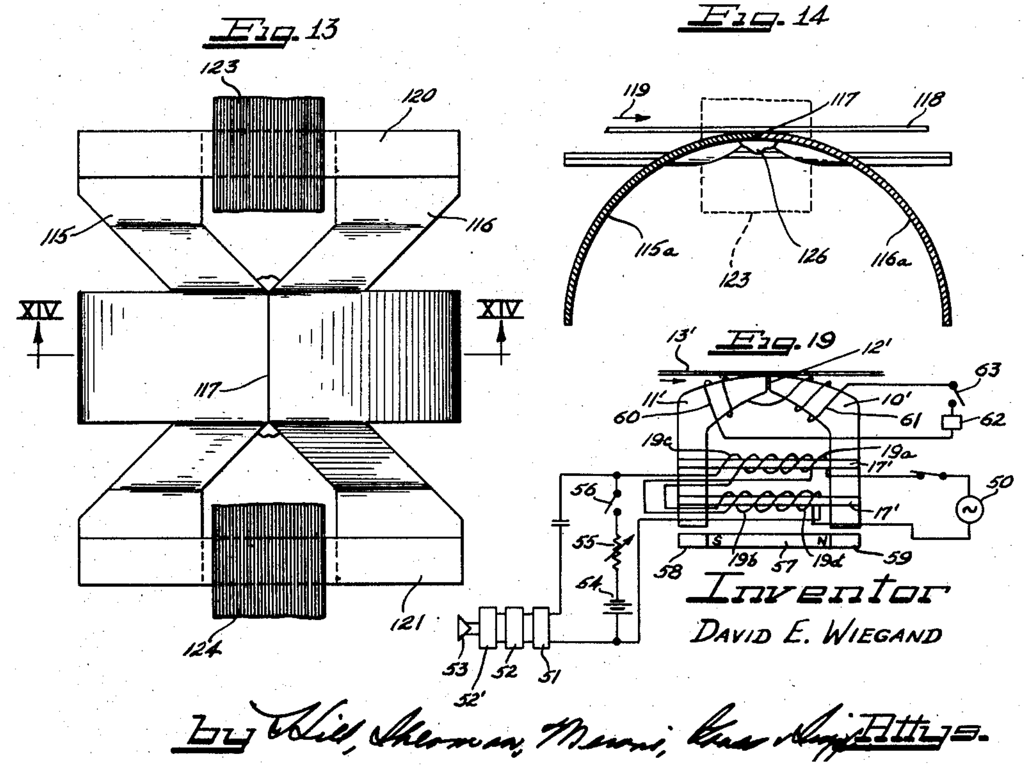
Figure 13 is a top plan view of another modification of head construction in accordance with the present invention.
Figure 14 is a longitudinal sectional view taken generally along the line XIV—XIV of Fig. 13.
Figure 19 is a schematic view illustrating exciting and pickup circuits for any of the preceding heads.

As illustrated diagrammatically in Fig. 19, bifilar windings 19*a* and 19*b* on saturating strips 17′, 17′ may be connected with a relatively high frequency oscillator 50 to produce opposing or out of phase high frequency fluxes at the gap 12′, the high frequency fluxes effectively circulating in the loop circuit including the two saturating strips 17′, 17′. Pickup winding portions 19*c* and 19*d* are wound in aiding relation with respect to the gap 12′ and the output from winding portions 19*c* and 19*d* is delivered to an amplifier 51 tuned to the second harmonic of the oscillator 50 and then to an amplitude modulation detector 52, a power amplifier 52′ and an output device such as a loudspeaker 53. The detector 52 may be the conventional detector used in radio circuits.

A battery 54 and resistor 55 are connected across the windings 19*c* and 19*d* in series with a switch 56 so that the battery 54 may establish a polarizing flux in the same direction in each of the strips 17′. Optionally, the switch 56 may be opened and a polarizing magnet structure may be provided including a magnet 57 having poles as indicated by the letters N and S and having plates of magnetic material 58 and 59 connected at the opposite poles in proximity to the lower portions of the legs of the pole pieces 10′ and 11′. The required polarizing flux is that which will be greater than any signal flux linking the saturating strips 17′, and it is found that a value of polarizing flux in this range will not appreciably effect the record member 13′.

The head of Fig. 19 may be operated as a record head by connecting windings 60 and 61 to a signal source 62 through a switch 63. Windings 60 and 61 can be used as pickup windings also if desired.

It will be understood that the windings 19 in Figs. 1 to 6 may be connected as illustrated for windings 19*a* and 19*b* in Fig. 19.

As disclosed in my copending application Serial No. 492,013, filed March 3, 1955, and assigned to the assignee of the instant application, magnetic modulator heads can operate with only a single saturating strip and preferably in such a case the exciting winding may comprise a single conductor having a number of turns in one direction and a number of turns in the opposite direction on the saturating member so as to generate opposed high frequency fluxes with respect to the non-magnetic gap.

Figure 9:
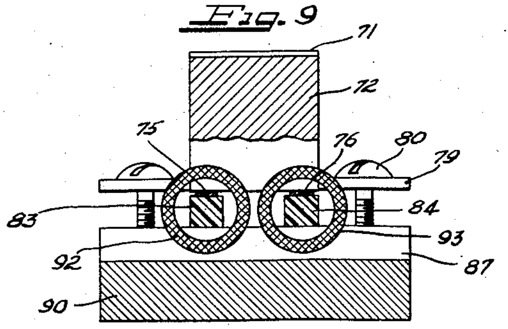
Figure 9 is a transverse sectional view taken on the line IX—IX of Fig. 7.

Referring now to the head of Figs. 7 through 9, there is illustrated a magnetic modulator head construction comprising a pair of pole pieces 70 and 71 secured together by suitable non-magnetic means such as solder 72 to define a non-magnetic gap 73 for coupling the head to a magnetic record member. The free ends 70*a* and 71*a* of the pole shoes are clamped in low reluctance contact with saturating strips 75 and 76 by means of clamping plates 78 and 79 and clamping screws 80. As in the previous embodiment, the saturating strips 75 and 76 are supported by means of non-magnetic support members 83 and 84 for facilitating handling of the strips and mountings thereof with the head. The support members 83 and 84 bridge a gap 87 in a base 90 of non-magnetic material to which the clamp screws 80 are secured. The recess 87 serves to accommodate the bifilar windings 92 and 93 on the respective saturating strip assemblies. An important advantage of this head construction is that it can be readily disassembled and reassembled with the various components of the heads replaced as may be desired or necessary.

By way of a specific example, the pole shoes 70 and 71 may be .020 inch "Mumetal" with a .00025 inch copper gap spacer. The base may be made of aluminum and the supporting strips 84 may be of Bakelite. The clamping members should be of aluminum and the screws for example of brass tested for traces of magnetism. The clamping screws are secured to the base 90 at the opposite sides of the pole pieces 70 and 71 so that there are no holes in the pole pieces. The coils may be cemented to the underside of the Bakelite strips 83 and 84, leaving the upper surfaces clean and flat for easy insertion of the saturating strips 75 and 76. The Bakelite strips may be cemented to the aluminum base 90.

A magnetic shield structure may be provided for the head of Figs. 7 to 9 including a bottom plate with the edges turned up at right angles permanently fastened to the base 90 and an upper shield member slotted to receive a record member as in Fig. 5 and with side aprons engaging and lapping the turned up edges of the bottom part of the shield. The upper shield part should be conveniently removable to allow simple head disassembly.

The windings 92 and 93 may comprise two identical coils each wound on a .094 inch diameter arbor and consisting of 51 turns of bifilar #30 HF wire in three layers, 18 turns in the first layer, 17 in the second and 16 in the third. The length of the first layer may be kept within 7/16 of an inch and the outside diameter of the coil within 5/16 of an inch. One winding of one saturating strip may be connected with one winding on the other strip in opposing relation with respect to the non-magnetic gap and the two windings in series connected to a relatively high frequency oscillator as illustrated for winding portions 19*a* and 19*b* in Fig. 19, while the other two wires may be connected in aiding relation with respect to the non-magnetic gap as indicated for winding portions 19*c* and 19*d* in Fig. 19 for providing the signal output from the head. The signal output leads may be connected with an amplifier tuned to the second harmonic of the oscillator frequency and to a phase demodulaor or detector power amplifier and output device as illustrated in Fig. 19, and suitable polarizing means may be employed such as the battery 54 and resistor 55 in Fig. 19 (with switch 56 closed).

Figure 12:
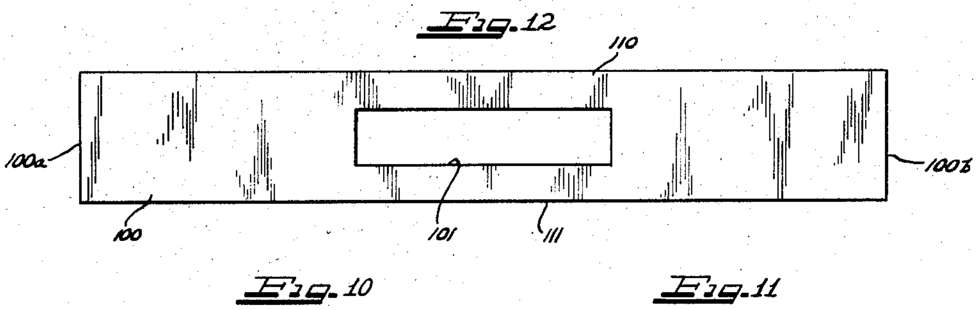
Figure 12 is a developed view of the magnetic core forming the head of Fig. 10.
Figure 10:
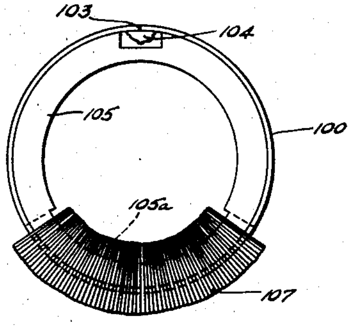
Figure 10 is a side elevational view of a still further form of head construction in accordance with the present invention.
Figure 11:
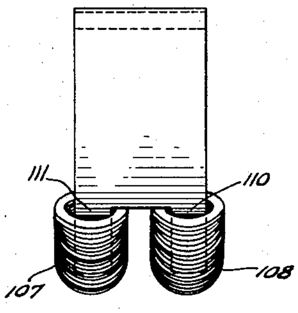
Figure 11 is an end view of the head of Fig. 10.

In the embodiment of Figs. 10 to 12, a magnetic modulator head construction is formed from a single strip 100 of magnetic material having a slot or window 101 therein. The free edges 100*a* and 100*b* are brought into proximity to define a non-magnetic gap 103 as indicated in Fig. 10 for coupling to a magnetic record member, the ends being soldered as indicated at 104, for example. The strip 100 is secured to a suitable non-magnetic tube 105, and windings 107 and 108 are wound on the reduced cross section strip portions 110 and 111 provided by the slot 101. The tube 105 is of course slotted in registry with the slot 101 and provides backing strips 105*a* for the strip portions 110 and 111. It will be observed that this head construction is extremely simple and avoids extra gaps in the magnetic circuit such as are present when pole shoes are coupled to the separate saturating strip.

By way of example of an actual head construction, a .005 inch thick "Deltamax" strip may be wrapped around a 1/2 inch outside diameter fiber tube and be 1/4 inch wide. The window may be 3/32 of an inch to provide reduced cross section strip portions 5/64 inch wide, the window being for example 1/2 inch long. "Deltamax" comprises 50% nickel and the remainder iron and minor constituents.

In annealing the strip, the strip is wrapped around a steel rod having the same diameter as the outside diameter of the fiber tube. A piece of sheet iron is then wrapped around the outside of the strip to protect the strip from direct flame. The assembly is heated to bright red in a gas soldering oven and cooled slowly. Care is used to prevent bending of the strip on removal from the annealing fixture and subsequent operations. After soldering the gap, the strip is cemented to the fiber tube. This head construction has the additional important advantage of insuring identity of magnetic characteristics between the two saturating strip portions 110 and 111, where two such strip portions are to be utilized. It will be apparent that the same head may have only a single reduced strip portion by providing notches in the strip, for example instead of the window. The circuit connections may be the same as illustrated in Fig. 19 and the saturating portions may have the range of cross sections discussed heretofore.

In the embodiment of Figs. 13 and 14, a pair of strips of magnetic material 115 and 116 are provided with confronting edges intermediate their length to define a non-magnetic gap 117 for coupling to a magnetic record member 118 traveling as indicated by arrow 119 in Fig. 14. In this embodiment, saturating strips 120 and 121 bridge across the respective opposite ends of the strips 115 and 116 to define a first magnetic circuit independent of the gap, and a pair of magnetic circuits including the gap. The windings 123 and 124 may provide high frequency exciting fluxes in series aiding relation about the circuit exclusive of the gap and signal pickup windings in aiding relation with respect to the two circuits including the gap, that is in aiding relation at the gap 117. The central portions 115*a* and 116*a* of the core strips are formed arcuately as indicated in Fig. 14 and offset upwardly to provide a suitable contact surface for the tape 118. This core construction as well as that of Figs. 10 to 12 has a particular advantage in avoiding sharp bends in the core material which might cause magnetic discontinuities or like imperfections. The gap 117 may be soldered as indicated at 126, and the core strips may be of .020 inch "Mumetal," while the saturating strips may be made of .005 inch "Deltamax."

Figure 15:
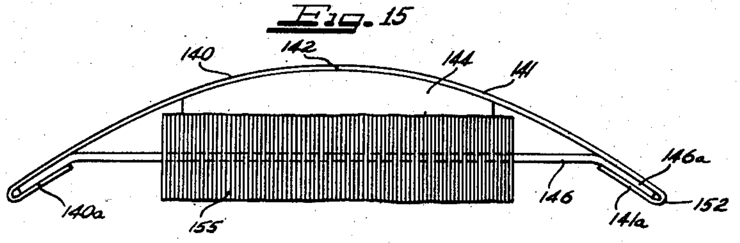
Figure 15 is a side elevational view of still another form of head construction in accordance with the present invention.
Figure 16:
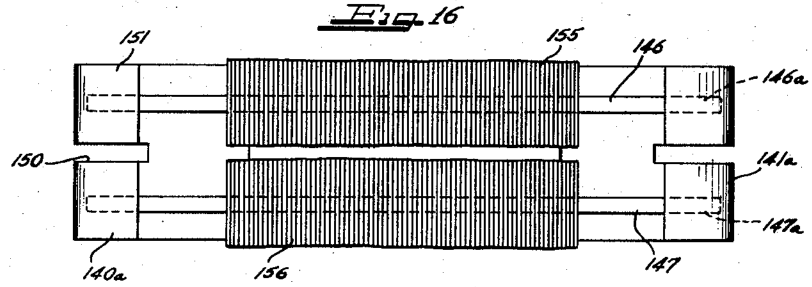
Figure 16 is a bottom plan view of the head of Fig. 15.

The head of Figs. 15 and 16 comprises a pair of pole shoes 140 and 141 providing a non-magnetic gap 142 carried by a non-magnetic block 144. A pair of saturating strips 146 and 147 are illustrated as being secured to the pole shoes by crimping of the free ends 140*a* and 141*a* of the pole shoes about the ends 146*a* and 147*a* of the saturating strips. As seen in Fig. 16, the ends 140*a* and 141*a* may be slotted as indicated at 150 so as to provide individual tabs such as 151 for the respective ends of each of the saturating strips. This head construction has the particular advantage that it requires no separate fastening means and therefore is capable of being made highly compact. Further, it will be noted that the most serious bend at 152 in Fig. 15 in the magnetic material is substantially outside of the magnetic circuit.

By way of example, in an actual head construction the pole shoes may be .006 inch thick "Mumetal" with a .00025 inch gap spacer and the mounting block may be made of insulating material or non-magnetic metal. The coils 155 and 156 may each comprise 8 bifilar turns of number 40 HF wire in a single layer wound on .030 inch diameter arbors. The pole shoes 140 and 141 may define an arc having a .300 inch radius, and the saturating strips may be .001 inch thick by .016 inch wide "Molypermalloy." The windings may be connected and the saturating strips dimensioned as described in the previous embodiments. It will be apparent, that the saturating strips may be provided by a strip portion such as shown in Fig. 12, with the disadvantage that the arc coils must be wound directly on the saturating portions.

Figure 18:
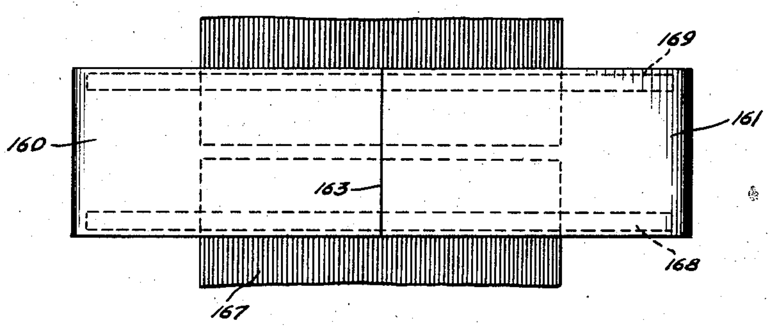
Figure 18 is a top plan view of the head construction of Fig. 17.
Figure 17:
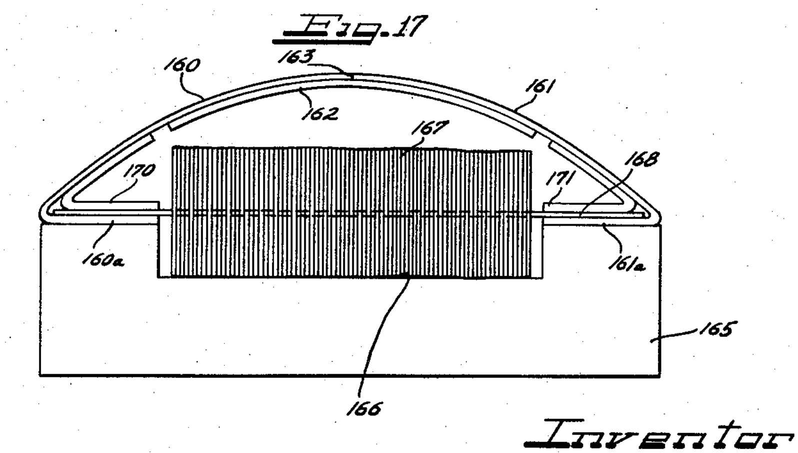
Figure 17 is a side elevational view of a further head construction in accordance with the present invention.

The embodiments of Figs. 17 and 18 comprises a pair of pole shoes 160 and 161 secured to a stiffener member of non-magnetic metal 162 and defining a non-magnetic gap 163. The free ends 160*a* and 161*a* of the pole shoes are turned inwardly and cemented to a base 165 having a recess 166 accommodating the windings 167 on saturating strips 168 and 169. The respective ends of the saturating strips rest on the inturned end portions 160*a* and 161*a* and are wedged into low reluctance contact by wedge members 170 and 171.

In an actual embodiment according to Figs. 17 and 18, the shoes comprise .006 inch "Mumetal," and the wedges 170 and 171 are also of "Mumetal" while the base is of an insulating material. The inturned legs of the shoes were cemented to the base, the coils 167 cemented to the base, and the wedges were also preferably cemented in place. The winding circuits and saturating strip dimensions are preferably similar to those of previous embodiments.

It will be apparent that many modifications and variations other than those suggested herein may be made without departing from the scope of the novel concepts of the present invention.

I claim as my invention:

1. A magnetic modulator head comprising a pair of core pieces defining therebetween a non-magnetic gap for coupling to a magnetic record medium and providing a relatively large cross-section path of magnetic material for magnetic signal flux introduced at said gap, said core pieces having broad flat exterior surfaces lying substantially in a common plane, magnetically saturable means providing a path of magnetic material for magnetic signal flux which is of substantially reduced cross-section in comparison with said relatively large cross-section path provided by said core pieces, said magnetically saturable means extending between said core pieces and comprising a straight relatively thin bridging strip of magnetic material having opposite free ends with broad flat lateral surfaces in overlapping extended flatwise engagement with said broad flat exterior surfaces of said core pieces, means on said magnetically saturable means for establishing an exciting flux therein, and means characterized by providing an unexpectedly improved signal-to-noise ratio comprising the relationship between the total cross-section of said magnetic signal flux path of substantially reduced cross-section provided by said magnetically saturable means and the maximum residual flux capacity of the record medium and providing a maximum signal flux density in said magnetically saturable means which when added to any polarizing and feedback flux density therein is between about $\frac{1}{50}$ and $\frac{2}{3}$ the saturation induction for the material of said magnetic signal flux path of substantially reduced cross-section.

2. A magnetic head according to claim 1 wherein a relatively rigid member has a surface in engagement with a surface of said strip for rigidifying said strip and being of elongated strip construction and of contour generally conforming to that of said strip of magnetic material.

3. A magnetic head according to claim 1 wherein a relatively rigid member has a surface in engagement with a surface of said strip for rigidifying said strip, the strip having spaced relatively wide portions engaging said broad flat exterior surfaces of said core pieces and having a relatively narrow intermediate portion providing said path of substantially reduced cross-section.

4. A magnetic head according to claim 1 wherein a member of rectangular cross-section and of elongated strip construction has a surface in supporting engagement with a surface of said strip for supporting said strip and said exciting flux establishing means comprises a winding encircling both said strip and said member.

5. A magnetic head according to claim 1 wherein said strip has spaced relatively wide portions engaging said broad flat exterior surfaces of said core pieces and has a relatively narrow intermediate portion providing said path of substantially reduced cross-section.

6. A magnetic head according to claim 1 wherein a member of relatively rigid strip construction has a surface in engagement with a surface of said strip for supporting said strip in bridging relation between said core pieces.

7. A magnetic head according to claim 1 wherein a member has a surface in supporting engagement with a surface of said strip, and means is provided comprising said member for detachably clamping the respective ends of said strip against the broad flat exterior surfaces of said core pieces.

8. A magnetic head according to claim 1 wherein said core pieces have ends which are inturned to provide said broad flat exterior surfaces for supporting the respective ends of said strip, and wedge means of magnetic material is provided pressing the ends of said strip against the respective free ends of said core pieces.

9. A magnetic head according to claim 1 wherein said core pieces each have opposite free ends and an intermediate portion between said opposite free ends, the intermediate portions of the core pieces being closely spaced to define said non-magnetic gap, and said magnetically saturable means comprising separate members of magnetic material of reduced cross-section bridging between and overlapping the respective pairs of free ends of said core pieces.

10. A magnetic head according to claim 1 wherein said core pieces have free ends which are inturned to provide said broad flat exterior surfaces for supporting the respective ends of said strip.

References Cited in the file of this patent

UNITED STATES PATENTS

| | | |
|---|---|---|
| 2,469,444 | Roys | May 10, 1949 |
| 2,532,100 | Howell | Nov. 28, 1950 |
| 2,536,272 | Friend | Jan. 2, 1951 |
| 2,581,209 | Shepard | Jan. 1, 1952 |
| 2,658,113 | Holmes | Nov. 3, 1953 |
| 2,674,659 | Buhrendorf | Apr. 6, 1954 |
| 2,722,569 | Loper | Nov. 1, 1955 |

FOREIGN PATENTS

| | | |
|---|---|---|
| 907,707 | Germany | Mar. 29, 1954 |
| 907,708 | Germany | Mar. 29, 1954 |